(12) United States Patent
Le Bastard (10) Patent No.: US 7,857,262 B2
(45) Date of Patent: Dec. 28, 2010

(54) DEVICE FOR COMPENSATING FOR THE MECHANICAL PLAY OF A HELICOPTER FLIGHT CONTROL

(75) Inventor: Jean-Claude Le Bastard, Toulouse (FR)

(73) Assignee: Thales (FR)

( * ) Notice: Subject to any disclaimer, the term of this patent is extended or adjusted under 35 U.S.C. 154(b) by 744 days.

(21) Appl. No.: 11/909,064

(22) PCT Filed: Mar. 7, 2006

(86) PCT No.: PCT/EP2006/060527

§ 371 (c)(1),
(2), (4) Date: Sep. 18, 2007

(87) PCT Pub. No.: WO2006/097418

PCT Pub. Date: Sep. 21, 2006

(65) Prior Publication Data

US 2008/0179463 A1 Jul. 31, 2008

(30) Foreign Application Priority Data

Mar. 18, 2005 (FR) .................................. 05 02713

(51) Int. Cl.
G05D 1/00 (2006.01)
(52) U.S. Cl. ...................... 244/194; 244/193; 244/17.13
(58) Field of Classification Search ................. 244/194, 244/193, 17.13, 39, 75.1, 76 R; 701/3, 14
See application file for complete search history.

(56) References Cited

U.S. PATENT DOCUMENTS

| 4,282,234 | A | * | 8/1981 | Durant et al. ................ 514/363 |
| 4,426,607 | A | | 1/1984 | Black et al. |
| 4,841,202 | A | * | 6/1989 | Dishner et al. ................. 318/14 |
| 5,428,543 | A | * | 6/1995 | Gold et al. ...................... 701/5 |
| 6,793,173 | B2 | * | 9/2004 | Salesse-Lavergne ..... 244/17.13 |
| 7,725,215 | B2 | * | 5/2010 | Stange et al. ................... 701/1 |
| 2003/0057331 | A1 | * | 3/2003 | Kinkead et al. ............. 244/194 |
| 2003/0080256 | A1 | * | 5/2003 | Urnes et al. ................. 244/194 |

FOREIGN PATENT DOCUMENTS

| EP | 1036734 | 9/2000 |
| EP | 1037130 | 9/2000 |
| FR | 2706153 | 12/1994 |
| FR | 2771071 | 5/1999 |

* cited by examiner

*Primary Examiner*—Christopher P Ellis
(74) *Attorney, Agent, or Firm*—Lowe Hauptman Ham & Berner, LLP (57) ABSTRACT

The present invention relates to helicopter automatic piloting equipment. The automatic piloting device for helicopter acts on flight controls of the helicopter that are affected by mechanical play by means of a group of mechanically irreversible rams termed series rams with fast response and short stroke, placed in series on the flight controls. According to the invention, the device comprises at least one detector for detecting direction of variation of the displacement instructions of the series rams and a play compensator adding to the instruction, as a function of the latter's direction of variation, a corrective term dependent on the mechanical play affecting the flight control equipped with the series ram concerned.

11 Claims, 7 Drawing Sheets

DEVICE FOR COMPENSATING FOR THE MECHANICAL PLAY OF A HELICOPTER FLIGHT CONTROL

CROSS-REFERENCE TO RELATED APPLICATIONS

The present Application is based on International Application No. PCT/EP2006/060527, filed Mar. 7, 2006 which in turn corresponds to France Application No. 05 02713, filed on Mar. 18, 2005 and priority is hereby claimed under 35 USC §119 based on these applications. Each of these applications are hereby incorporated by reference in their entirety into the present application.

BACKGROUND OF THE INVENTION

The present invention relates to helicopter automatic piloting equipment.

To stabilize and direct his craft, a helicopter pilot manually actuates piloting means (cyclic stick, collective pitch and pedals) to act on the helicopter piloting axes (main rotor or tail rotor). A lateral or longitudinal displacement of the cyclic stick makes it possible to act respectively on the lateral or longitudinal axis of the helicopter by modifying the incidence of the blades of the main rotor. The collective pitch makes it possible to adapt the engine power to the flight conditions by modifying the incidence of the blades of the main rotor. The pedals make it possible to orient the nose of the helicopter by modifying the incidence of the blades of the tail rotor. The motion of the piloting means is transmitted to the piloting axes by means of mechanical transmission chains which consist of various mechanical relays. The assembly consisting of a piloting means and an associated mechanical transmission chain constitutes a flight control linked to the piloting axis considered. The end of the flight control in contact with the associated piloting means is called the output end of the flight control.

Like any dynamic mechanical system, flight controls are affected by mechanical play which implies that the motion of the piloting means is not fully retransmitted to the piloting axes.

Helicopters are often equipped with automatic piloting equipment which acts on the flight controls, under the authority of the pilot, with a view to fulfilling two main missions: a first mission of pilot assistance, and a second mission of automatic piloting.

When it assists the pilot in the manual command of his helicopter, the automatic piloting equipment makes it possible on the one hand to dampen the movements of the machine so as to facilitate control thereof by the pilot, and on the other hand to maintain the current flight configuration (lateral and longitudinal trims, and heading) thus allowing the pilot to momentarily release the piloting means without placing himself in a flight configuration that would be dangerous.

When it is in automatic piloting mode, the automatic piloting equipment makes it possible to slave one or more flight parameters (altitude, vertical speed, longitudinal speed, lateral speed, heading, navigation, etc.) to one or more instruction values chosen beforehand by the pilot.

To act on a flight control, the automatic piloting equipment employs rams, called "series rams" because they are in series with the flight controls. "Series rams" are mechanical actuators which comprise a body and an output axis, they are in general of the endless screw/nut type and they have a short stroke and a small response time. They transform an electrical control into a translational motion of their output axis with respect to their body.

"Series rams" are said to be "mechanically irreversible", that is to say they deform only when an electrical control is applied to them. In particular when the automatic piloting equipment is not operational, the "series rams" have no effect on the command of the helicopter.

The displacement of the output axis of the "series ram" is slaved in position on the basis of the position information delivered by a position sensor which indicates the position of the output axis of the "series ram" with respect to its body.

Like any dynamic mechanical system, "series rams" are affected by mechanical play. On account of the slaving to the position of the output axis of the ram, this ram play is compensated for at each change of direction by a more significant travel of the motorization of the ram. During the time necessary for the play to be taken up, the position of the output axis of the ram with respect to the body of the ram is fixed. The output axis is slaved to the requested position only when the play is compensated.

The mechanical play of the flight controls and of the "series rams", even if reduced, increases the difficulty of piloting a helicopter in particular under turbulent flight conditions.

Although the "series rams" are integrated with the flight controls of the helicopter and insofar as their impact is different, a distinction is drawn hereinafter between on the one hand the play of the "series rams" and on the other hand the play of the flight controls. These mechanical plays produce three different effects:

- a delay induced by the time necessary for the "series ram" to take up its play after each change of direction of displacement. Insofar as the slaving is done with regard to the position of the "series ram", there is no loss of effectiveness of the control at the "series ram" level.
- a delay induced by the time necessary for the "series ram" to traverse the play of the flight controls after each change of direction of displacement.
- a loss of amplitude of the control actually transmitted due to the fact that the displacement of the flight control is not slaved in position. This loss of amplitude corresponds to a loss of effectiveness of the control.

These three effects together cause a very sharp degradation in the performance of the automatic piloting equipment, by inducing for example a sustained oscillation of its attitudes. These effects are perceptible both in assisted piloting mode and in automatic piloting mode, since in both cases, the commands aimed at acting on the helicopter piloting axes are transmitted by way of the flight controls.

A solution for alleviating this problem consists in reducing the plays by attending to the mechanical realization of the helicopter flight controls. This approach is rapidly halted by the technical difficulties and costs.

SUMMARY OF THE INVENTION

The present invention is aimed at remedying the drawbacks induced by the presence of the mechanical plays of the helicopter flight controls and of the "series rams" by introducing compensation for this play at the level of the "series rams" displacement instructions formulated by the automatic piloting equipment.

The subject of the invention is an automatic piloting device for helicopter acting on flight controls of the helicopter that are affected by mechanical play, by means of a group of mechanically irreversible rams termed "series rams" with fast response and short stroke, placed in series on the flight controls, characterized in that it comprises at least one direction detector for detecting the direction of variation of the displacement controls of the "series rams" and a play compensator adding to the displacement controls of a "series ram" a corrective term dependent on the direction of variation of its last displacement control and the mechanical play affecting the flight control equipped with the "series ram" concerned.

Advantageously, the detector for detecting the direction of variation of the controls exhibits a hysteresis effect.

Advantageously, the automatic piloting device generates the ram displacement controls on the basis of position instructions that it has formulated beforehand and its play compensator adds a corrective term to a ram displacement control through a modification of the position instruction from which it stems.

Advantageously, when the helicopter is equipped with two copies of an automatic piloting device and two groups of "series rams", placed pairwise, in series in the flight controls, the copies of the automatic piloting device generate each of the displacement controls for one of the rams of a pair of "series rams" of a flight control, each ram of the pair of "series rams" performing half of the desired displacement.

BRIEF DESCRIPTION OF THE DRAWINGS:

Other characteristics and advantages of the invention will emerge from the description hereinafter of an embodiment given by way of example. This description will be offered in relation to the appended drawings in which:

FIG. 3b is a curve chart showing the shape of the temporal evolution of the position of the output axis of a "series ram" affected by mechanical play and slaved in position, in response to a displacement instruction in accordance with the chart of FIG. 3a;

FIG. 4b is a curve chart showing the shape of the temporal evolution of the position of the output end of a flight control affected by mechanical play, in response to the motion of the output axis of an associated "series ram", which evolves in accordance with the chart of FIG. 4a;

To facilitate the reading of the description, the same labels will designate the same elements in the various figures.

DESCRIPTION OF THE PREFERRED EMBODIMENT

Figure 1:
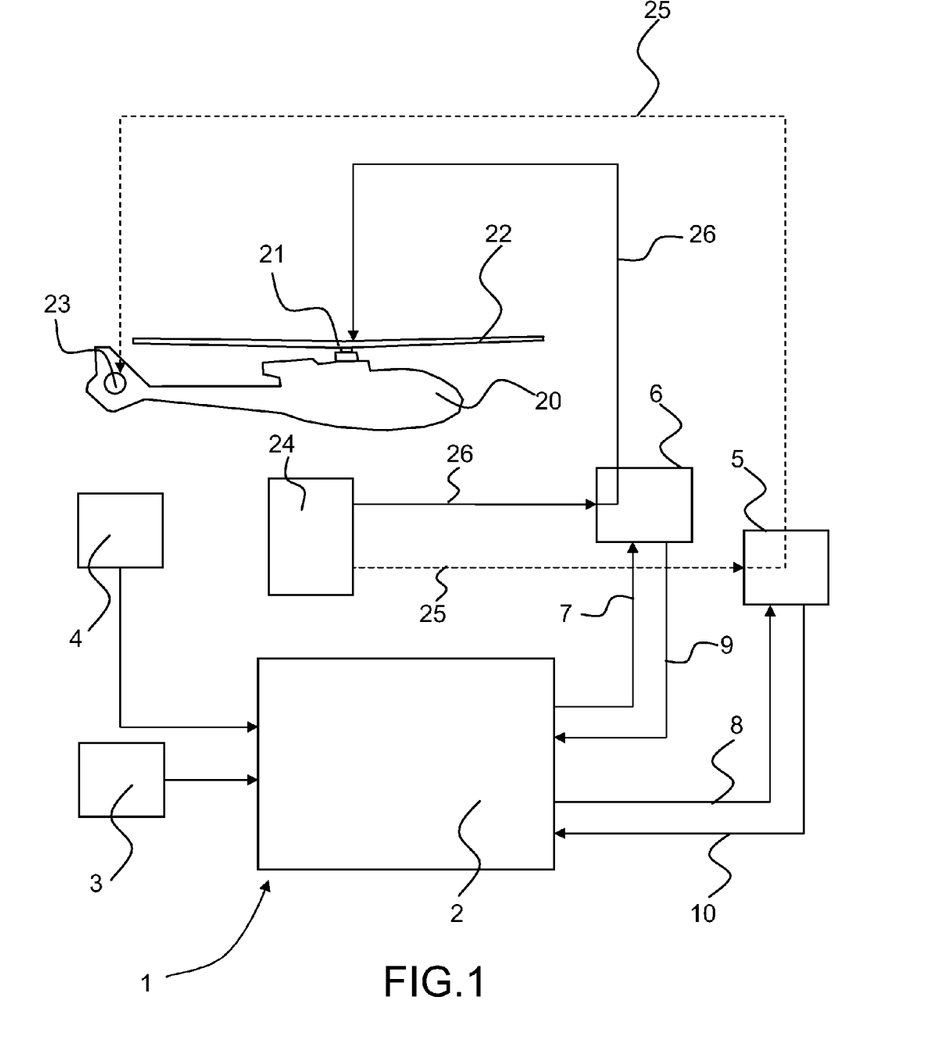
FIG. 1 represents the schematic diagram of helicopter piloting equipment provided with an automatic piloting device according to the invention.

For the sake of clarity in the drawing, the automatic piloting equipment 1 of a helicopter 20 is schematically represented in FIG. 1 outside the helicopter 20 although it is on board.

The helicopter 20 comprises a main rotor 21 for ensuring lift, advance, control of the lateral and longitudinal attitudes, a tail rotor 23 for controlling yaw, manual piloting means (stick, collective pitch, pedal bar) 24 connected by flight controls (mechanical transmission chains) 25, 26 to the elements for controlling the incidence of the blades of the rotors 21, 23 of the helicopter.

The automatic piloting equipment 1 mainly comprises:
  manual piloting means 24 (cyclic stick, collective pitch and pedals or the like) allowing the pilot to act on the flight controls 25, 26;
  an automatic piloting device 2;
  a set of sensors 3, delivering, on the basis of measurements, the actual values of flight parameters, such as angular speeds, attitudes, heading, accelerations;
  adjustment means 4 allowing the pilot of the helicopter 20 to fix, at the automatic piloting device 2, instruction values of flight parameters such as the altitude, height, vertical speed, attitude, acceleration of the helicopter 20;
  sets of "series rams" 5, 6 inserted in series in the flight controls 25, 26 and controlled by the automatic piloting device 2. The "series rams" 5, 6 transmit their current position to the automatic piloting device 2, via the links 9 10.

The automatic piloting device 2 calculates as a function of the sensor data 3 the position instructions of the "series rams" 5, 6 and ensures the positional slaving of these "series rams" by delivering the displacement controls, by way of the link 7, 8.

Figure 2:
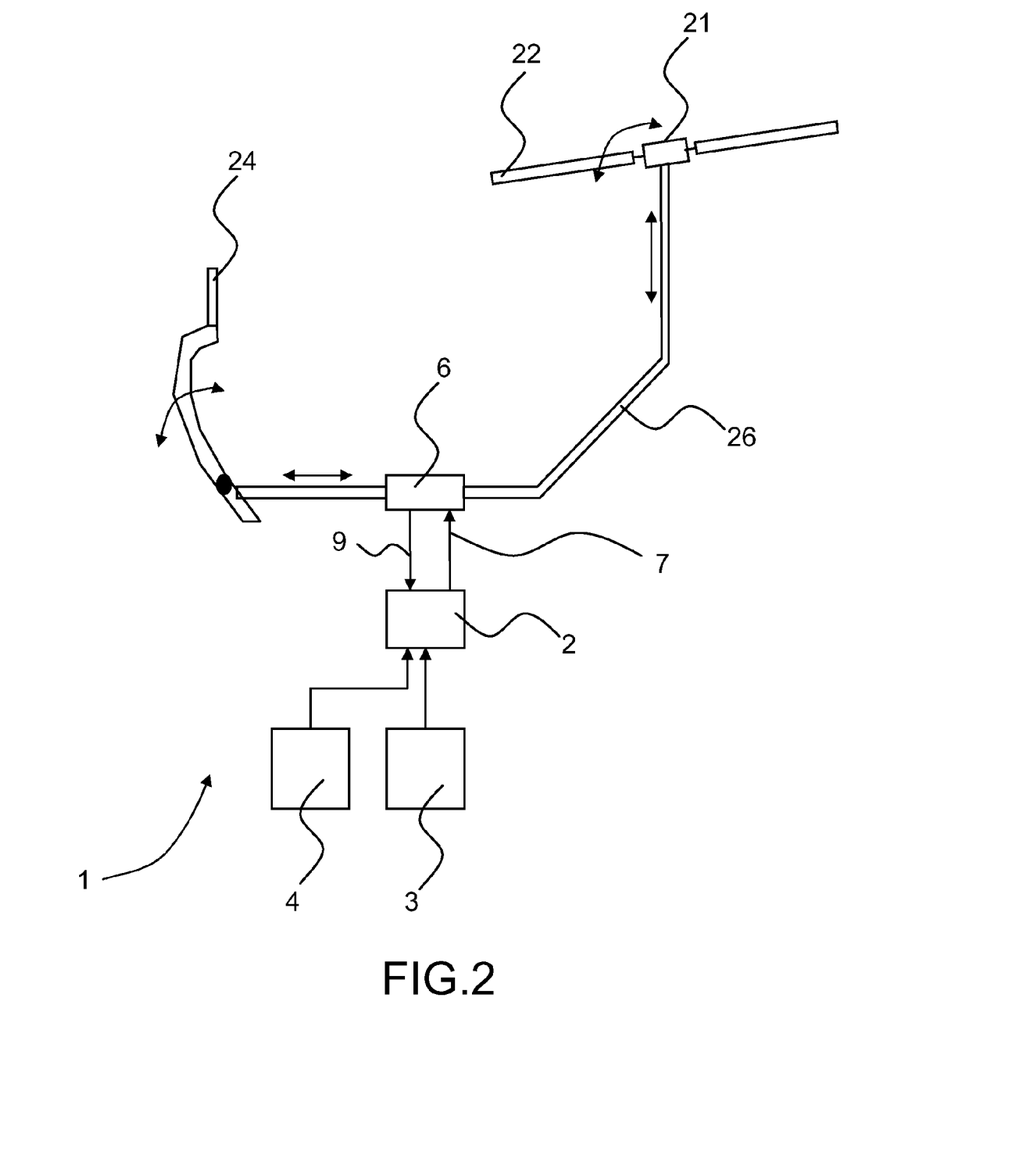
FIG. 2 represents an exemplary flight control of a helicopter controlled by an automatic piloting device according to the invention.

FIG. 2 situates the "series rams" 6 with respect to the manual piloting means 24 and to the flight controls 26 acting on the rotor 21.

The "series rams" 6, placed in series with the flight controls 26, make it possible to position the flight controls 26 as a function of the position calculated by the automatic piloting device 2.

It is proposed that the "series rams" 6 be utilized to compensate for the effects of mechanical play of the flight control 26 both in "manual" piloting mode and in automatic piloting mode. It will be seen that the effects of the mechanical plays of the "series rams" 6 will also be reduced by this compensation.

Figure 3A:
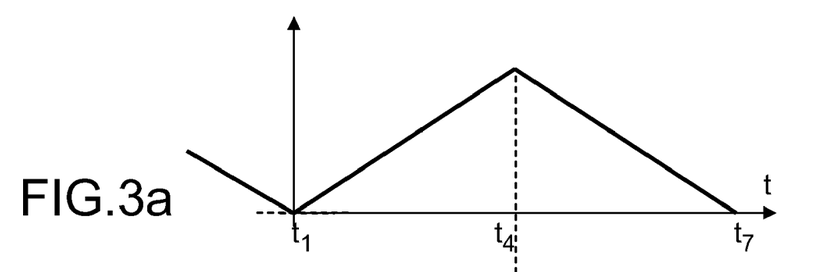
FIG. 3a is a curve chart representing an example of the temporal evolution of a displacement instruction for the output axis of a "series ram"

FIG. 3a is a chart showing an example of the time-dependent evolution of a displacement control that can be imparted to a "series ram" by an automatic piloting device.

Hereinafter, consideration is given to a "series ram" which expands when a displacement control is applied to it in a direction termed "increasing" and which contracts when a displacement control is applied to it in the other direction termed "decreasing".

Under ideal conditions, that is to say in the absence of mechanical play, the position of the end of the output axis of the "series ram" exactly follows the displacement control and moves longitudinally in extension or in retraction under the action of a control.

The play of a "series ram" is quantified by the value $\Delta j_v$. On account of the positional slaving of the output axis of the ram, the play induces, at each change of direction, a temporary absence of motion of the output axis of the ram (referring to graph 3a, between the dates $t_1$ and $t_2$ or between the dates $t_4$ and $t_5$). The duration necessary for the play to be taken up is therefore related to the value $\Delta j_v$ of the ram play and to the speed of travel of the motorization of the ram by the following relation: $\Delta j_v = (t_2 - t_1) *$ ram speed When the automatic piloting device controls the motion of the output axis of a "series ram" by employing positional slaving, the displacement control for the "series ram" is formulated on the basis of a position instruction.

Figure 3B:
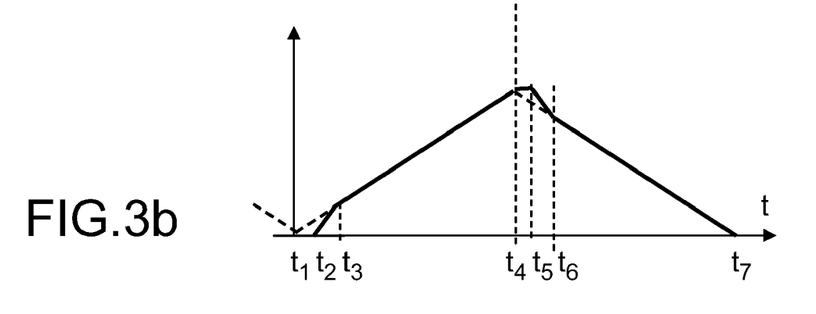

FIG. 3b represents, shown dashed, the temporal evolution of the position of the end of the output axis of a "series ram" without mechanical play, whose motion is controlled by means of positional slaving, the position instruction evolving over time according to the chart of FIG. 3a.

FIG. 3b represents, shown solid, the temporal evolution of the position of the end of the output axis of a "series ram" affected by mechanical play, whose motion is controlled by means of positional slaving, the position instruction evolving over time according to the chart of FIG. 3a.

In the instants which follow a change of the direction of variation of the position instruction (from $t_1$ to $t_2$ and from $t_4$ to $t_5$), the motor of the "series ram" rotates at a speed that is all the larger the larger the deviation between the instruction and the position of its output axis of the "series ram": As long as the mechanical play $j_v$ of the "series ram" is not compensated, the end of its output axis remains immobile.

From the moment this play is compensated (at $t_2$ and at $t_5$), the end of the output axis of the "series ram" starts moving and its position homes in on that imposed by the instruction. This homing takes places at a speed that is all the larger the larger the deviation between the instruction and the position of the output axis of the "series ram". From the moment the homing is carried out (from $t_3$ and $t_6$) the position of the end of the output axis is slaved to the instruction position.

The function of a flight control is to transmit a displacement command to the means for piloting the associated helicopter. The output end of the flight control moves as a function of the displacement instructions formulated by the pilot or the automatic piloting device and in the latter case takes the form of a displacement of the output axis of the "series ram" which is associated therewith.

Figure 4A:
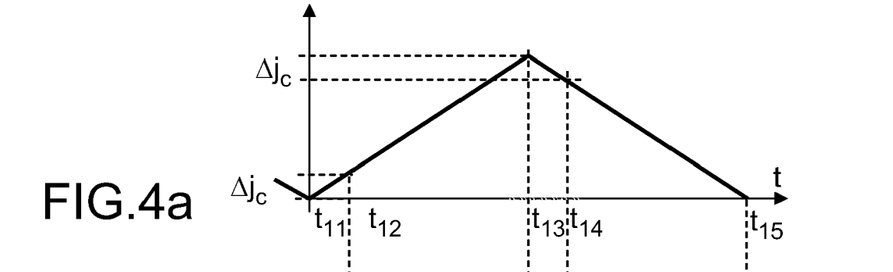
FIG. 4a, is a curve chart representing an example of the temporal evolution of the position of the output axis of a "series ram"

FIG. 4a is a chart showing an exemplary time-dependent evolution of the position of the output axis of a "series ram" that can be controlled by an automatic piloting device.

Figure 4B:
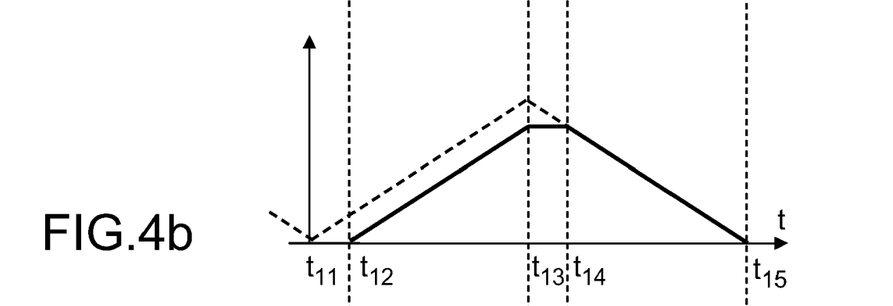

FIG. 4b represents, shown dashed, the displacement of the position of the output end of a flight control affected by no mechanical play in response to a displacement control imparted by the position of the output axis of the "series ram" evolving over time according to the chart of FIG. 4a.

FIG. 4b represents, shown solid, the displacement of the position of the output end of a flight control affected by mechanical play in response to a displacement control imparted by the position of the output axis of the "series ram" evolving over time according to the chart of FIG. 4a. In the instants which follow a change of the direction of variation of the displacement instruction (from $t_{11}$ to $t_{12}$ and from $t_{13}$ to $t_{14}$), the end of the flight control affected by mechanical play remains immobile. Subsequently (from $t_2$ to $t_3$) its position follows an evolution proportional to that of the position instruction but with a certain delay.

The mechanical play of the flight control is quantified by the value $\Delta j_c$ which corresponds to the position deviation to be given to the end of the output axis of a "series ram" which is associated therewith, after a reversal of its direction of displacement, such that the output end of the flight control starts moving again. That is to say, referring to graph 4a, to the position deviation of the end of the output axis of the "series ram" between the dates $t_1$ and $t_2$ or between the dates $t_3$ and $t_4$.

Figure 4C:
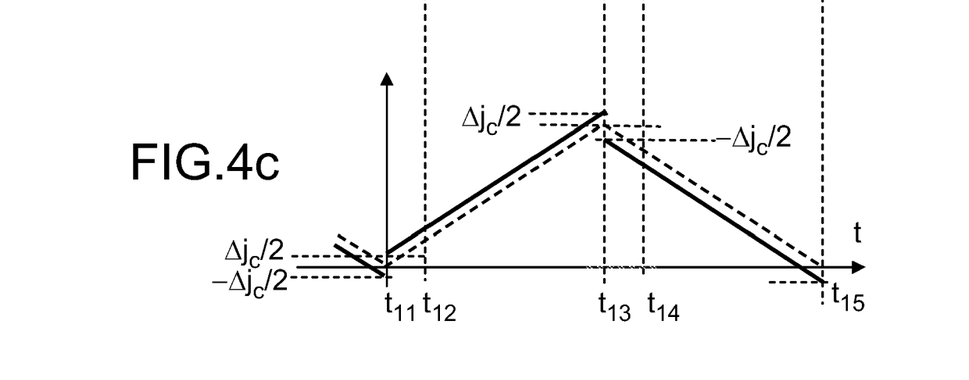
FIG. 4c is a curve chart showing the shape to be given to the temporal evolution of the position of the output axis of a "series ram" to compensate for the effect of mechanical play affecting the associated flight control.

FIG. 4c shows the shape of the temporal evolution of the motion of the output axis of a "series ram" such that the temporal evolution of the output end of the flight control corresponds to that which is shown dashed in FIG. 4b.

More generally, to compensate for the effects of the play of a flight control, the position of the output axis of the "series ram" is corrected with respect to that which it would be necessary to give it if it was associated with a flight control without mechanical play. When the position instruction of the output axis of the "series ram" has a positive slope, the correction consists in adding half of $\Delta j_c$ to the position instruction. When the variation in the position instruction of the output axis of the "series ram" reverses, the correction consists in subtracting half of $\Delta j_c$ from the position instruction. Thus compensated, the position instruction effects a deviation of total amplitude $\Delta j_c$, at each change of direction of variation of the displacement instruction of the output axis of the "series ram" and the flight control is immediately moving.

This way of compensating for the mechanical play of a flight control at the "series ram" position instruction level entails an increase in the amplitude of the displacement instruction applied to the "series ram". This increase, which follows the change of direction of the instruction, has the effect of increasing the instantaneous slaving error. Insofar as the speed of the motor of the "series ram" is directly related to this error, this has the effect of increasing the speed of the motor. The result of compensating for the flight control play effects is to accelerate the reduction in the "series ram" play effects.

Figure 5:
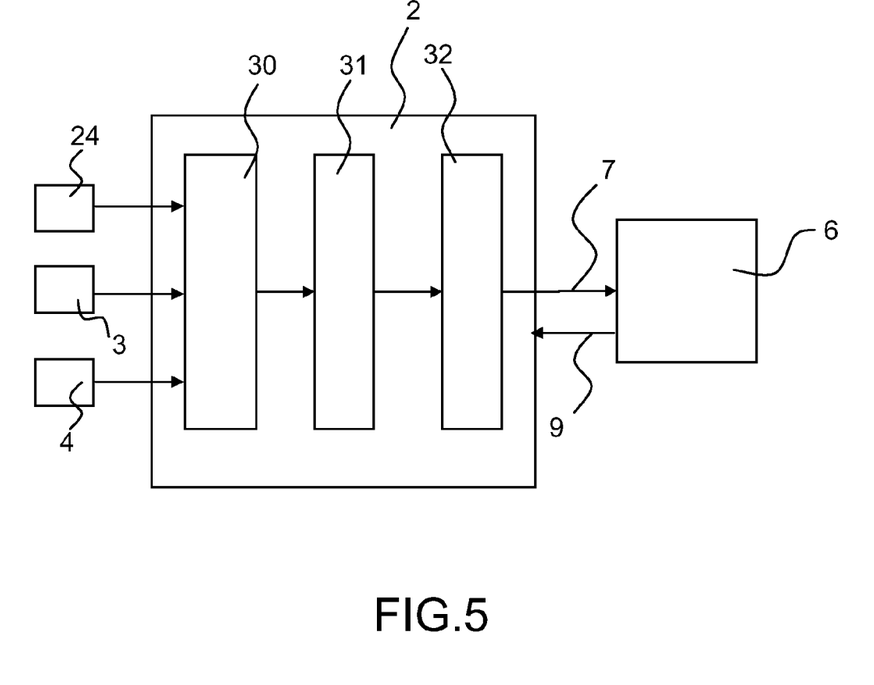
FIG. 5 represents the schematic diagram of an automatic piloting device according to the invention coupled to the actuators allowing it to act on a flight control.

As shown in FIG. 5, the automatic piloting device 2 can be organized as three stages:

a first stage 30 formulates the position instructions of the "series rams" 6 by applying the known helicopter piloting laws to the helicopter's actual flight parameters delivered by the set of sensors 3 of the equipment for piloting the helicopter and by taking account of the actual positions of the "series rams" 6, the loads exerted by the pilot on the manual piloting means 24, the desired piloting mode introduced by the pilot by way of the adjustment means 4. This stage modulates the electrical power delivered to the "series ram" 6 as a function of the slaving error.

The third stage 32 receives position instructions for "series rams" 6 and transforms them into displacement controls taking account of the actual positions of the "series rams" as delivered by their position sensors.

The second stage 31 adds, if necessary, compensations to the position instructions of the "series rams" so as to compensate for the mechanical plays.

Figure 6:
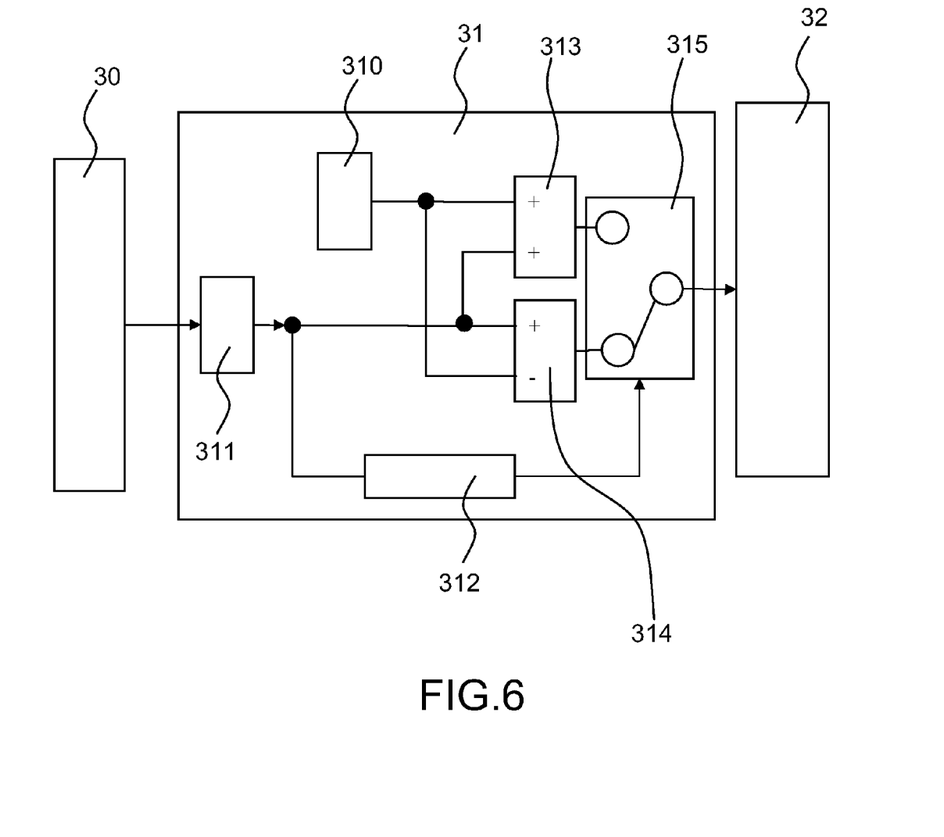
FIG. 6 represents the schematic diagram of the play compensation circuit for an automatic piloting device according to the invention.

FIG. 6 shows a possible exemplary embodiment of this second stage 31. In this exemplary embodiment, the second stage 31 comprises:

a register 310 storing arbitrary corrective values corresponding to half the average values of the mechanical plays of the flight controls estimated on the basis of measurements performed on one or more helicopters of the same type as the helicopter concerned;

an antinoise filter 311 processing the variations in the position instructions formulated by the first stage 30 of the automatic piloting device 2, in particular so as to eliminate the noise spectral lines at the rotation frequencies of the rotors of the helicopter;

an adder 313 adding to the value of a position instruction arising from the antinoise filter 311 and intended for a "series ram", the corrective value stored in the register 310 and corresponding to the average value of the mechanical play of the flight control on which the "series ram" concerned is mounted;

a subtracter 314 deducting from the value of a position instruction arising from the antinoise filter 311 and intended for a "series ram", the corrective value stored in the register 310 and corresponding to the average value of the mechanical play of the flight control on which the "series ram" concerned is mounted;

a detection circuit 312, with hysteresis effect, for detecting the direction of variation of the position instructions arising from the antinoise filter 311 and intended for one and the same "series ram". The circuit evaluates the absolute value of the deviation between two successive position instructions. When this value is less than a threshold fixed a priori, the direction of variation is considered to be unchanged, in the converse case the direction of variation is considered to be equal to the sign of the measured deviation;

a multiplexer 315 addressed by the direction of variation detection circuit 312, delivers as output from the automatic piloting device 2 the instructions compensated for positions intended for the "series rams" 6 originating from the adder 313 or the subtracter 314 as a function of the direction of displacement of the "series ram" concerned. The value considered is that arising from 313 if the sign of the variation in the filtered displacement control 51, detected by the device 315, is positive or the value arising from 314 if the sign of the variation in the filtered displacement control 51, detected by the device 315, is negative.

For safety reasons, the automatic piloting equipment 2 is often doubled, each copy being provided with self-test circuits. The two redundant copies of automatic piloting equipment then operate in parallel, informing each other of their operating states.

Figure 7:
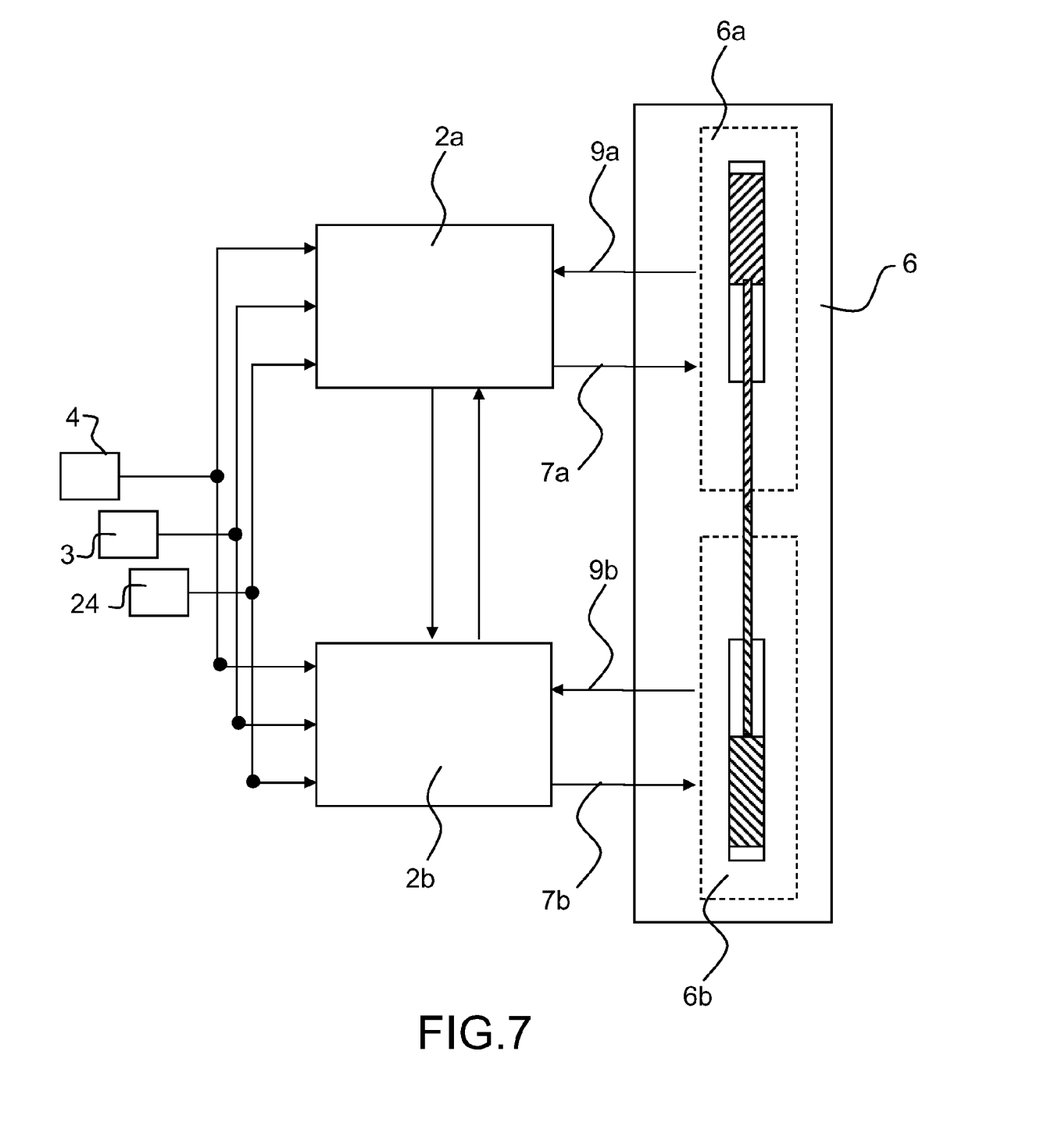
FIG. 7 represents the schematic diagram of two redundant copies of an automatic piloting device operating in parallel for the purpose of safety and their coupling to series actuators disposed in series on a flight control.

As represented in FIG. 7, in the presence of two redundant copies 2a, 2b of the automatic piloting device, the "series rams" are also doubled at the flight controls level. Each of the two redundant copies 2a, 2b of the automatic piloting device commands a copy 6a, 6b of the pair of "series rams" of a flight control on which it orders half the displacement that it would request in the presence of a single "series ram", the total displacement being shared equally between the two copies of the "series ram".

In the event of an operating problem detected by the self-test circuits of one of the copies 2a or 2b of the automatic piloting device or at the level of the "series ram" copy that it commands, the other copy 2b or 2a of the automatic piloting device is informed thereof and transfers control of the entire displacement over to the "series ram" copy that it commands.

The invention claimed is:

1. An automatic piloting equipment for a helicopter having at least one flight control, comprising:
    a group of series rams configured to act on the flight control of the helicopter, the group of series rams are placed in series with the flight control;
    an auto piloting device coupled to the group of series rams and configured to control the group of series rams according to a displacement instruction;
    at least one direction detector coupled to the auto piloting device and arranged for detecting a direction of variation of the displacement instruction; and
    a play compensator coupled to the auto piloting device and arranged for adding a corrective term to the displacement instruction, the corrective term being determined according to mechanical play affecting the flight control and a function of the direction of variation.

2. The equipment as claimed in claim 1, wherein the corrective term added by the play compensator is determined according to a value of the mechanical play of the flight control estimated on the basis of measurements performed on the helicopter.

3. The equipment as claimed in claim 1, wherein the at least one direction detector exhibits a hysteresis effect.

4. The equipment as claimed in claim 1, wherein the auto piloting device generates a plurality of ram displacement instructions for the group of series rams on the basis of a plurality of position instructions formulated by the auto piloting device a corrective term determined by the play compensator.

5. A helicopter comprising:
    at least one flight control;
    two groups of series rams placed pairwise, in series with the flight control;
    two auto piloting device each coupled to one of the two groups of series rams and configured to control a corresponding one of the two groups of series rams according to a displacement instruction;
    at least one direction detector coupled to the two auto piloting devices and arranged for detecting a direction of variation of the displacement instruction; and
    at least one play compensator coupled to the two auto piloting devices and arranged for adding a corrective term to the displacement instruction, the corrective term being determined according to mechanical play affecting the flight control and a function of the direction of variation.

6. The helicopter as claimed in claim 5, wherein the auto piloting devices are configured to control corresponding automatic piloting equipments individually for allowing each of the two groups of series rams to contribute half of a displacement requested by the displacement instruction.

7. The equipment as claimed in claim 2, wherein the at least one direction detector exhibits a hysteresis effect.

8. The equipment as claimed in claim 2, wherein the auto piloting device generates a plurality of ram displacement instructions for the group of series rams on the basis of a plurality of position instructions formulated by the auto piloting device and a corrective term determined by the play compensator.

9. The helicopter of claim 5, wherein the corrective term added by the play compensator is determined according to a value of the mechanical play of the flight control estimated on the basis of measurements performed on the helicopter.

10. The equipment as claimed in claim 1, further comprising:
    another group of series rams configured to act on the flight control of the helicopter, the another group of series rams are placed in series with the flight control and the group of series rams; and
    another auto piloting device coupled to the another group of series rams, the at least one direction detector, and the play compensator, the another auto piloting device being configured to control the another group of series rams according to the displacement instruction.

11. A helicopter comprising the automatic piloting equipment according to claim 1.

* * * * *